(12) United States Patent
Marpu et al.

(10) Patent No.: US 10,158,106 B2
(45) Date of Patent: Dec. 18, 2018

(54) BEAM SYSTEM FOR ELECTRIFIED VEHICLE BATTERY PACKS

(71) Applicant: FORD GLOBAL TECHNOLOGIES, LLC, Dearborn, MI (US)

(72) Inventors: Amar Marpu, Canton, MI (US);
Abdelmonaam Sassi, Windsor (CA);
Nathan Kristofor Tardif, Ferndale, MI (US); Peyman Aghssa, Ann Arbor, MI (US); Anil Reddy Pullalarevu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 297 days.

(21) Appl. No.: 15/015,397

(22) Filed: Feb. 4, 2016

(65) Prior Publication Data

US 2017/0229690 A1 Aug. 10, 2017

(51) Int. Cl.
*H01M 2/10* (2006.01)
*B60K 6/28* (2007.10)
*B60K 6/40* (2007.10)
*B60K 6/445* (2007.10)
*B60K 1/04* (2006.01)

(52) U.S. Cl.
CPC ............ *H01M 2/1083* (2013.01); *B60K 1/04* (2013.01); *B60K 6/28* (2013.01); *B60K 6/40* (2013.01); *B60K 6/445* (2013.01); *H01M 2/1077* (2013.01); *B60Y 2200/92* (2013.01); *B60Y 2400/112* (2013.01); *B60Y 2410/10* (2013.01); *H01M 2220/20* (2013.01); *Y10S 903/907* (2013.01); *Y10S 903/951* (2013.01)

(58) Field of Classification Search
CPC ............ H01M 2/1083; H01M 2/1077; H01M 2220/20; B60K 6/40; B60K 6/445; B60K 6/28; B60Y 2200/92; B60Y 2410/10; B60Y 2400/112; Y10S 903/951; Y10S 903/907

See application file for complete search history.

(56) References Cited

U.S. PATENT DOCUMENTS

| | | | |
|---|---|---|---|
| 5,906,899 A * | 5/1999 | Noda | H01M 2/20 429/149 |
| 6,632,560 B1 | 10/2003 | Zhou et al. | |
| 8,210,301 B2 | 7/2012 | Hashimoto et al. | |
| 8,585,066 B2 | 11/2013 | Young et al. | |
| 2009/0148754 A1* | 6/2009 | Marchio | H01M 2/1077 429/83 |
| 2012/0175320 A1* | 7/2012 | Paramasivam | H01M 2/1077 211/26 |
| 2012/0321927 A1 | 12/2012 | Loo et al. | |
| 2013/0026989 A1* | 1/2013 | Gibbs | H01M 10/441 320/116 |
| 2014/0182958 A1* | 7/2014 | Rawlinson | B60K 1/04 180/68.5 |

* cited by examiner

*Primary Examiner* — Lisa S Park

(74) *Attorney, Agent, or Firm* — Carlson, Gaskey & Olds

(57) ABSTRACT

A battery pack according to an exemplary aspect of the present disclosure includes, among other things, a tray, a cover mounted to the tray and a beam system including a first beam attached to the tray and a second beam attached to the cover.

20 Claims, 6 Drawing Sheets

SECTION A-A

BEAM SYSTEM FOR ELECTRIFIED VEHICLE BATTERY PACKS

TECHNICAL FIELD

This disclosure relates to a battery pack for an electrified vehicle. The battery pack includes a beam system configured to structurally reinforce an enclosure of the battery pack.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of interconnected battery cells that store energy for powering these electrical loads. The battery pack may be subjected to loading during vehicle testing, vehicle operation, or other loading events. Battery packs may therefore benefit from structural energy management.

SUMMARY

A battery pack according to an exemplary aspect of the present disclosure includes, among other things, a tray, a cover mounted to the tray and a beam system including a first beam attached to the tray and a second beam attached to the cover.

In a further non-limiting embodiment of the foregoing battery pack, the first beam and the second beam are top hat shaped.

In a further non-limiting embodiment of either of the foregoing battery packs, at least one of the first beam and the second beam is movable between a first position and a second position in response to a loading event in which a force is applied to either the tray or the cover.

In a further non-limiting embodiment of any of the foregoing battery packs, the first beam and the second beam abut one another in the second position.

In a further non-limiting embodiment of any of the foregoing battery packs, the first beam includes a first flared portion and the second beam includes a second flared portion, and the first flared portion nests with the second flared portion.

In a further non-limiting embodiment of any of the foregoing battery packs, the first flared portion is received over a protrusion of the tray.

In a further non-limiting embodiment of any of the foregoing battery packs, at least one of the first beam and the second beam includes an area of varying thickness.

In a further non-limiting embodiment of any of the foregoing battery packs, the first beam and the second beam are metallic structures.

In a further non-limiting embodiment of any of the foregoing battery packs, at least one cutout is established between the first beam and the second beam.

In a further non-limiting embodiment of any of the foregoing battery packs, a battery pack component is routed through the at least one cutout.

In a further non-limiting embodiment of any of the foregoing battery packs, a second beam system is spaced from the beam system.

In a further non-limiting embodiment of any of the foregoing battery packs, the first beam is attached to a bottom surface of the tray and protrudes toward the second beam, and the second beam is attached to an internal surface of the cover and protrudes toward the first beam.

A battery pack according to another exemplary aspect of the present disclosure includes, among other things, an enclosure, a battery assembly housed inside the enclosure and a beam system including a first beam attached to a first portion of the enclosure and a second beam attached to a second portion of the enclosure. The first beam and the second beam are configured to abut in response to deflection of either the first portion or the second portion during a loading event.

In a further non-limiting embodiment of the foregoing battery pack, the first beam and the second beam extend along a transverse axis, the transverse axis extending transverse to a longitudinal axis of the battery assembly.

In a further non-limiting embodiment of either of the foregoing battery packs, the first portion of the enclosure is a tray and the second portion is a cover.

In a further non-limiting embodiment of any of the foregoing battery packs, a second beam system is disposed between the first portion and the second portion of the enclosure.

In a further non-limiting embodiment of any of the foregoing battery packs, the beam system is disposed between the battery assembly and an electronic module housed inside the enclosure.

In a further non-limiting embodiment of any of the foregoing battery packs, the second beam is disposed at the same axial location as the first beam such that the second beam is directly above the first beam.

In a further non-limiting embodiment of any of the foregoing battery packs, at least one cutout is between the first beam and the second beam.

In a further non-limiting embodiment of any of the foregoing battery packs, a battery pack component is routed through the at least one cutout.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery pack of an electrified vehicle. The battery pack includes a beam system for structurally supporting the battery pack. In some embodiments, the beam system includes a first beam attached to a tray of a battery pack enclosure and a second beam attached to a cover of the battery pack enclosure. The first beam and the second beam are configured to abut one another in response to deflection of either the tray or the cover during a loading event. In this way, the beam system structurally reinforces the battery pack during the loading event. These and other features are discussed in greater detail in the following paragraphs of this detailed description.

Figure 1:
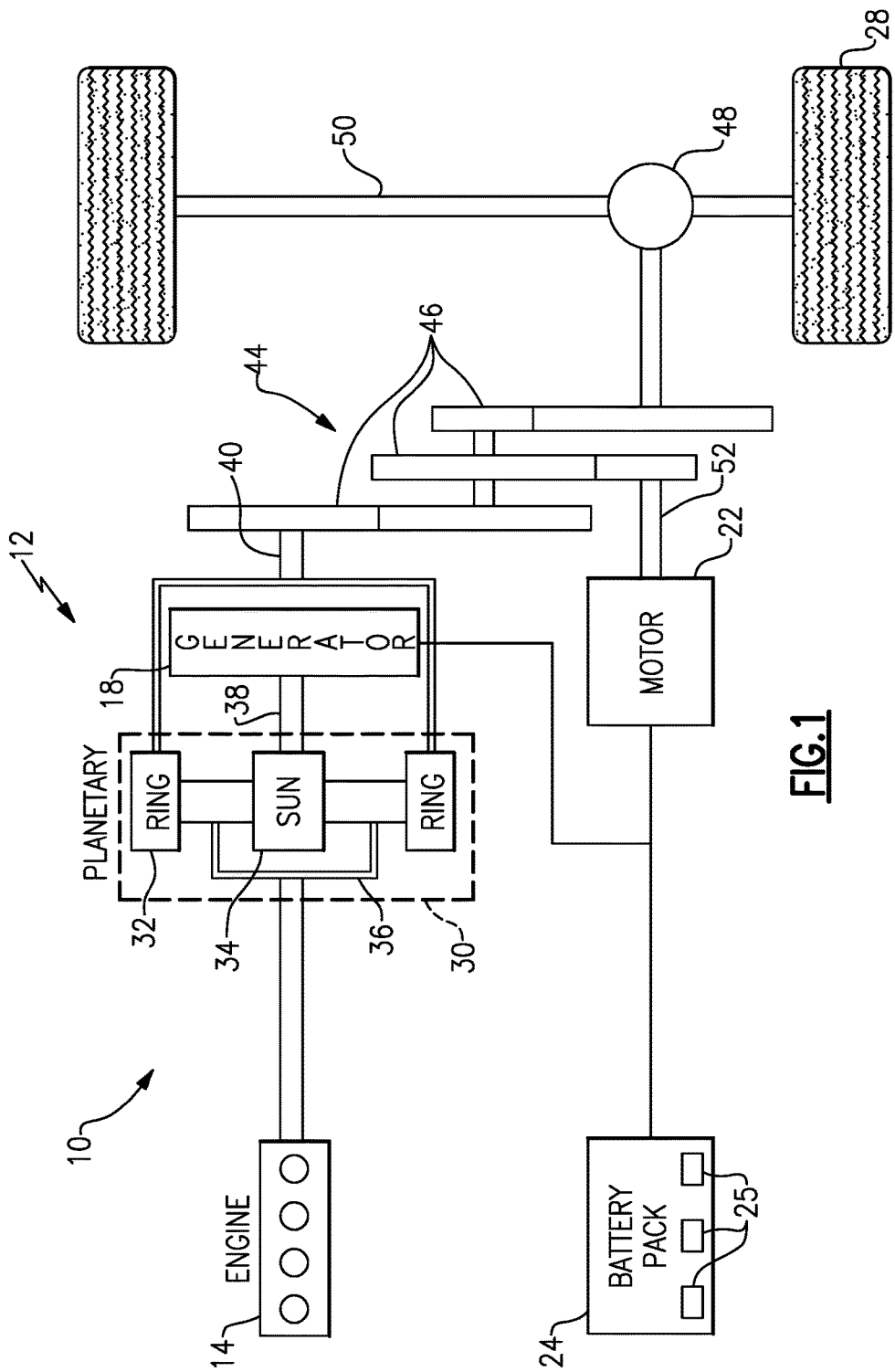
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
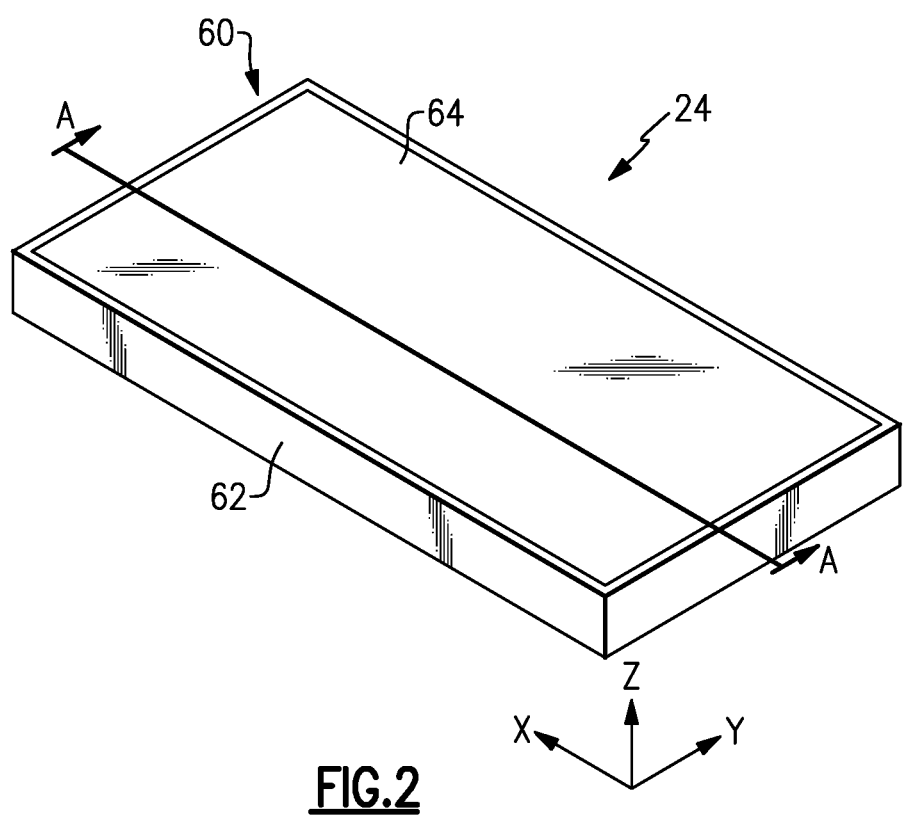
FIG. 2 illustrates a battery pack of an electrified vehicle.
Figure 3:
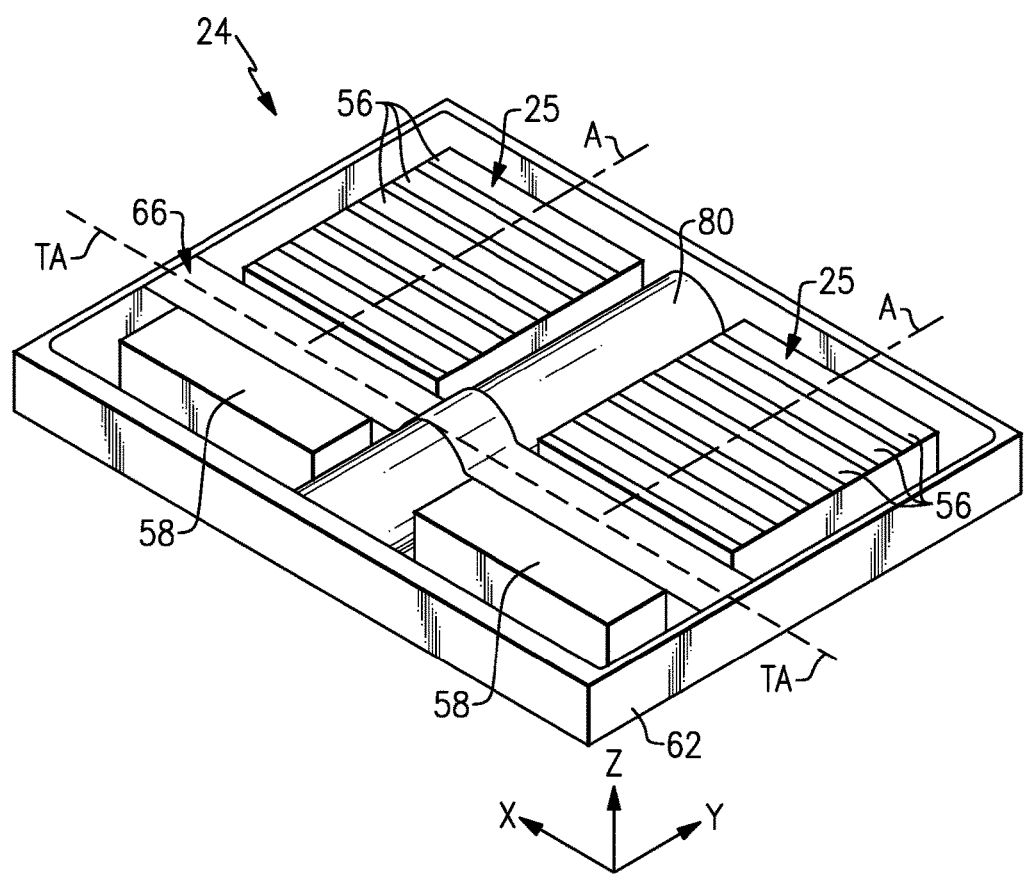
FIG. 3 illustrates the battery pack of FIG. 2 with the cover removed in order to better illustrate the internal components of the battery pack.

FIGS. 2 and 3 illustrate a battery pack 24 that can be employed within an electrified vehicle. For example, the battery pack 24 could be part of the electrified vehicle 12 of FIG. 1. The battery pack 24 includes a plurality of battery cells 56 (shown schematically in FIG. 3) that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIGS. 2 and 3.

The battery cells 56 may be stacked side-by-side along a longitudinal axis A or on top of one another to construct groupings of battery cells 56, sometimes referred to as "cell stacks." The battery pack 24 can include one or more separate groupings of battery cells 56.

In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

The battery cells 56, along with any other support structures (e.g., spacers, rails, walls, plates, etc.), may be collectively referred to as a battery assembly 25. Two battery assemblies 25 are shown in FIG. 3; however, the battery pack 24 could include a greater or fewer number of battery assemblies within the scope of this disclosure.

An enclosure 60 generally surrounds each battery assembly 25 of the battery pack 24. In one non-limiting embodiment, the enclosure 60 includes a tray 62 and a cover 64. The cover 64 is shown removed in FIG. 3 to better illustrate the interior features of the battery pack 24. The cover 64 is attachable to the tray 62 in order to cover the battery assemblies 25. The tray 62 and cover 64 together establish the enclosure 60, which houses the various hardware and electronics of the battery pack 24, including but not limited to the battery assemblies 25 and other electronic modules 58. The battery assemblies 25 and the electronic modules 58 may be located anywhere inside the enclosure 60. The cover 64 may be attached to the tray 62 in any known manner. In one non-limiting embodiment, the cover 64 is bolted to the tray 62.

Figure 4:
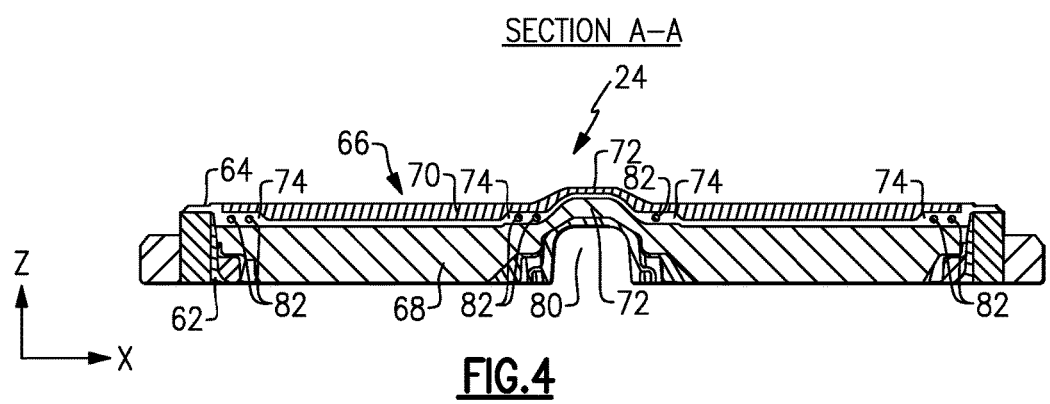
FIG. 4 is a cross-sectional view through Section A-A of FIG. 2.

Referring now primarily to FIGS. 3 and 4, the battery pack 24 additionally includes a beam system 66 for structurally reinforcing the battery pack 24. The beam system 66 is configured to protect the internal components of the battery pack 24 during loading events. During vehicle operation or vehicle testing, for example, the battery pack 24 may be subjected to loading events in which forces are applied to the battery pack 24 along the Z-axis. During such events, the beam system 66 acts as a stiffener to absorb loads and prevent excessive deformation or deflection of either the cover 64 or the tray 62.

The beam system 66 may include a first beam 68 and a second beam 70. The first beam 68 and the second beam 70 may be top hat shaped, in one non-limiting embodiment. The first beam 68 is attached to the tray 62 and the second beam 70 is attached to the cover 64. The first beam 68 is attached to an inside surface of the cover 64 and protrudes toward the tray 62 (i.e., like an inverted top hat), whereas the second beam 70 is attached to a bottom surface of the tray 62 and protrudes upwardly toward the cover 64. In one non-limiting embodiment, the first beam 68 and the second beam 70 are bolted to the tray 62 and the cover 64, respectively. In another non-limiting embodiment, the first beam 68 and the second beam 70 are welded to the tray 62 and the cover 64, respectively. Other attachment methodologies are also contemplated within the scope of this disclosure.

The first beam 68 and the second beam 70 of the beam system 66 are metallic structures, in one non-limiting embodiment. However, the first beam 68 and the second beam 70 could be made of any material having a sufficient stiffness to absorb loads applied to either the cover 64 or the tray 62. The first beam 68 and the second beam 70 can be stamped, machined, cast, etc.

The beam system 66 is positioned at a location of the battery pack 24 that may be susceptible to excessive deformation. The actual location of the beam system 66 is therefore considered design dependent and could vary depending on the size and shape of the battery pack 14, among other criteria. In one non-limiting embodiment, the beam system 66 extends along a transverse axis TA (e.g., from side to side in the X-axis direction). The transverse axis TA is generally transverse to the longitudinal axes A of the battery assemblies 25 (see FIG. 3). In another non-limiting embodiment, the first beam 68 and the second beam 70 of the beam system 66 are each positioned at the same axial location along the Y-axis. In this way, the second beam 70 is positioned directly above the first beam 68 in the Z-axis (see FIG. 4). In yet another non-limiting embodiment, the beam system 66 is disposed axially between the battery assemblies 25 and the electronic modules 58 (see FIG. 3). The beam system 66 could be configured of various cross-sections or combinations of cross-sections.

Figure 5:
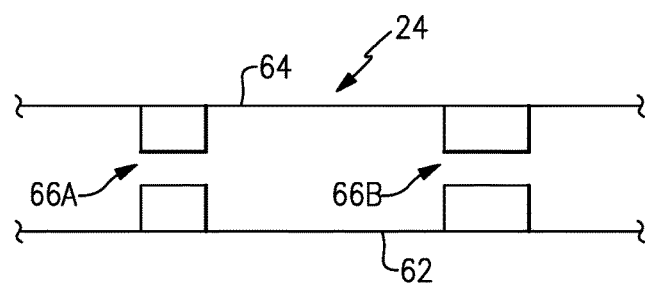
FIG. 5 is another cross-sectional view of a battery pack.

A single beam system 66 is depicted in FIGS. 3 and 4. However, the battery pack 24 could be equipped with multiple beam systems for further structurally reinforcing the battery pack 24 (see FIG. 5, which illustrates a battery pack 24 having a first beam system 66A and a second beam system 66B). It should thus be understood that the battery pack 24 could include any amount of beam systems 66 within the scope of this disclosure.

In yet another non-limiting embodiment, best illustrated in FIG. 4, each of the first beam 68 and the second beam 70 of the beam system 66 includes a flared portion 72. The flared portions 72 nest with one another. The flared portions 72 can optionally be provided if the tray 62 or the cover 64 includes any protrusions. One exemplary protrusion 80 of the tray 62 is illustrated in FIGS. 3 and 4. In such an embodiment, the flared portion 72 of the first beam 68 is received over the protrusion 80, and the flared portion 72 of the second beam 70 is received over the flared portion 72 of the first beam 68.

One or both of the first beam 68 and the second beam 70 may include areas of varying thickness. The areas of varying thicknesses create cutouts 74, or gaps, that extend between the first beam 68 and the second beam 70. The first beam 68 and the second beam 70 do not contact one another at the location of the cutouts 74, even subsequent to a loading event. Various battery pack components 82, including but not limited to bus bar modules, sense leads, high voltage wiring, coolant lines, etc., can be routed between the first beam 68 and the second beam 70 within the cutouts 74. During a loading event, the battery pack components 82 are not damaged by the abutting first beam 68 and second beam 70 because they are routed through the cutouts 74.

Figure 6A:
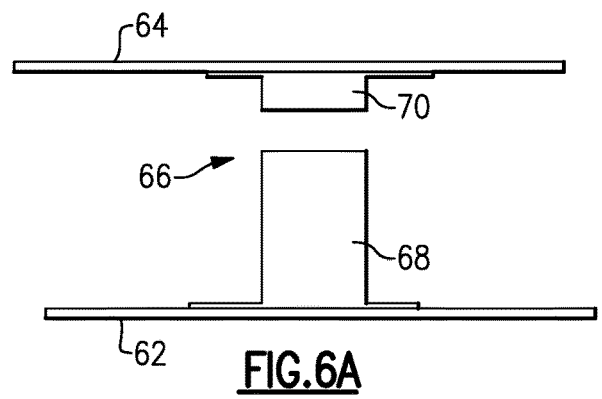
FIGS. 6A, 6B, 6C and 6D schematically illustrate operation of a beam system of a battery pack during loading events.
Figure 6B:
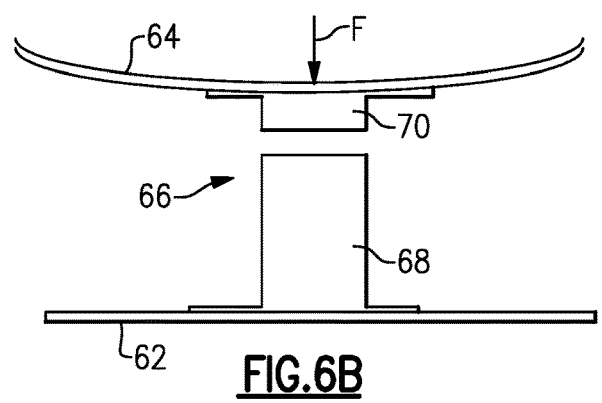
Figure 6C:
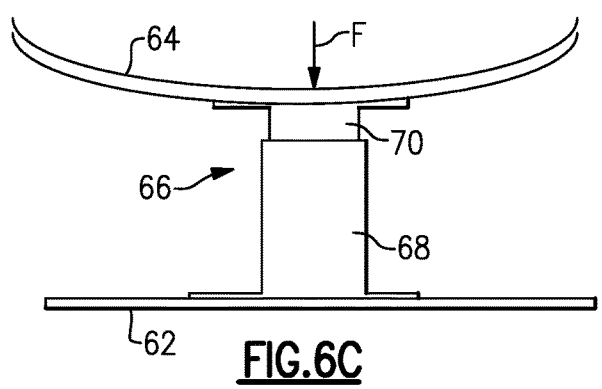

FIGS. 6A, 6B and 6C schematically illustrate operation of the beam system 66 during a loading event. The loading event may be any event in which a force F associated with the loading event is applied to either the tray 62 or the cover 64 of the battery pack 24. As discussed below, the first beam 68 and the second beam 70 of the beam system 66 are configured to abut one another in response to the loading event, thereby increasing the stiffness of the cover 64 and/or tray 62 to prevent excessive deformation, deflection, buckling, etc.

FIG. 6A illustrates the beam system 66 prior to application of the force F. As depicted, the first beam 68 and the second beam 70 of the beam system 66 are spaced from one another in their default positions prior to the loading event.

FIG. 6B illustrates a positioning of the beam system 66 in response to application of the force F at the cover 64. The second beam 70 begins to move from its default position, shown in FIG. 6A, to a second position that is closer to the first beam 68, shown in FIG. 6B, in response to application of the force F.

Referring to FIG. 6C, continued application of the force F at the cover 64 may cause the cover 64 to deform, deflect or buckle toward the tray 62 during the loading event. If the force F is large enough, the second beam 70 can move to a position in which it directly abuts against the first beam 68 to prevent further deformation, deflection or buckling of the cover 64.

Figure 6D:
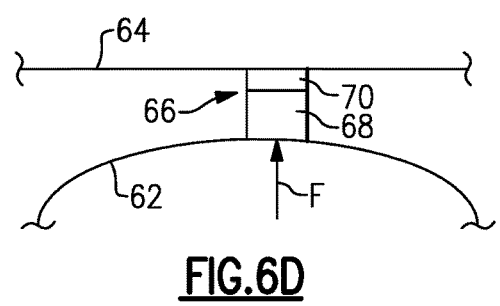

FIG. 6D illustrates another exemplary loading event in which the force F has been applied to the tray 62 rather than the cover 64. If the force F is large enough, the first beam 68 can move to a position in which it abuts against the second beam 70 to prevent further deformation, deflection or buckling of the tray 62.

Figure 7:
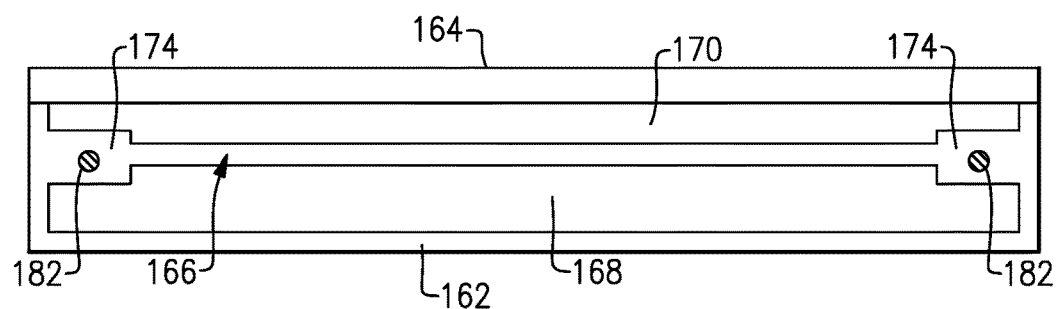
FIG. 7 illustrates another exemplary beam system for use in a battery pack.

FIG. 7 illustrates another exemplary beam system 166. The beam system 166 includes a first beam 168 attached to a tray 162 of a battery pack and a second beam 170 attached to a cover 164 of the battery pack. In this embodiment, the first beam 168 and the second beam 170 exclude any flared portions and are therefore substantially planar structures. However, the first beam 168 and/or the second beam 170 may include areas of varying thickness that establish cutouts 174 between the first beam 168 and the second beam 170. The cutouts 174 accommodate various battery pack components 182 that can be routed between the first beam 168 and the second beam 170.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a tray;
   a cover mounted to said tray; and
   a beam system including a first beam attached to said tray and a second beam attached to said cover,
   wherein said first beam includes a first flared portion and said second beam includes a second flared portion that nests with said first flared portion.

2. The battery pack as recited in claim 1, wherein said first beam and said second beam are top hat shaped.

3. The battery pack as recited in claim 1, wherein at least one of said first beam and said second beam is movable between a first position and a second position in response to a loading event in which a force is applied to either said tray or said cover.

4. The battery pack as recited in claim 3, wherein said first beam and said second beam abut one another in said second position.

5. The battery pack as recited in claim 1, wherein said first flared portion is received over a protrusion of said tray.

6. The battery pack as recited in claim 1, wherein at least one of said first beam and said second beam includes an area of varying thickness.

7. The battery pack as recited in claim 1, wherein said first beam and said second beam are metallic structures.

8. The battery pack as recited in claim 1, comprising at least one cutout established between said first beam and said second beam.

9. The battery pack as recited in claim 8, comprising a battery pack component routed through said at least one cutout.

10. The battery pack as recited in claim 1, comprising a second beam system spaced from said beam system.

11. The battery pack as recited in claim 1, wherein said first beam is attached to a bottom surface of said tray and protrudes toward said second beam, and said second beam is attached to an internal surface of said cover and protrudes toward said first beam.

12. A battery pack, comprising: an enclosure; a battery assembly housed inside said enclosure; and a beam system including a first beam attached to a first portion of said enclosure and a second beam attached to a second portion of said enclosure, wherein said first beam includes a first flared portion and said second beam includes a second flared portion that nests with said first flared portion, and wherein prior to a loading event said first beam and said second beam are spaced apart, and subsequent to the loading event said first beam and said second beam abut against one another.

13. The battery pack as recited in claim 12, wherein said first beam and said second beam extend along a transverse axis, said transverse axis extending transverse to a longitudinal axis of said battery assembly.

14. The battery pack as recited in claim 12, wherein said first portion of said enclosure is a tray and said second portion is a cover.

15. The battery pack as recited in claim 12, comprising a second beam system disposed between said first portion and said second portion of said enclosure.

16. The battery pack as recited in claim 12, wherein said beam system is disposed between said battery assembly and an electronic module housed inside said enclosure.

17. The battery pack as recited in claim 12, wherein said second beam is disposed at the same axial location as said first beam such that said second beam is directly above said first beam.

18. The battery pack as recited in claim 12, comprising at least one cutout between said first beam and said second beam.

19. The battery pack as recited in claim 18, comprising a battery pack component routed through said at least one cutout.

20. A method, comprising: positioning a beam system within a battery pack enclosure, wherein the beam system includes a first beam attached to a tray of the battery pack enclosure, a second beam attached to a cover of the battery pack enclosure, and a cutout established between the first beam and the second beam, said first beam including a first flared portion and said second beam including a second flared portion that nests with said first flared portion; and positioning a component within the cutout, the component including a bus bar module, a sense lead, a high voltage wire, or a coolant line, wherein prior to a loading event in which a force is applied to either the tray or the cover, the first beam and said second beam are spaced apart, and subsequent to the loading event, the first beam and the second beam abut one another without contacting the component.

\* \* \* \* \*